Nov. 23, 1965　　　　F. MALCOM　　　　3,219,211
ADJUSTABLE HYDRAULIC CRADLE HOIST FOR ROOF TRUSSES
Filed Aug. 19, 1963　　　　　　　　　3 Sheets-Sheet 1
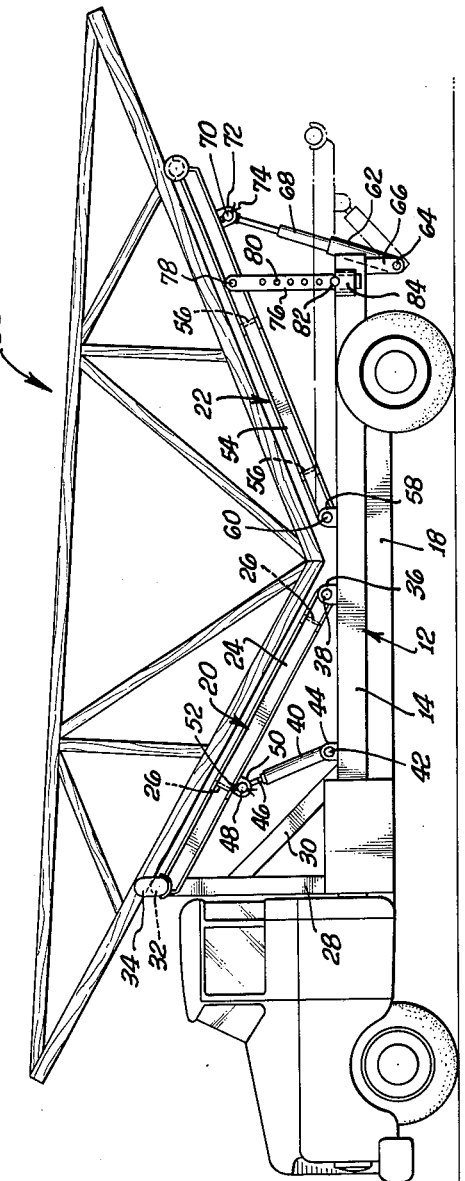
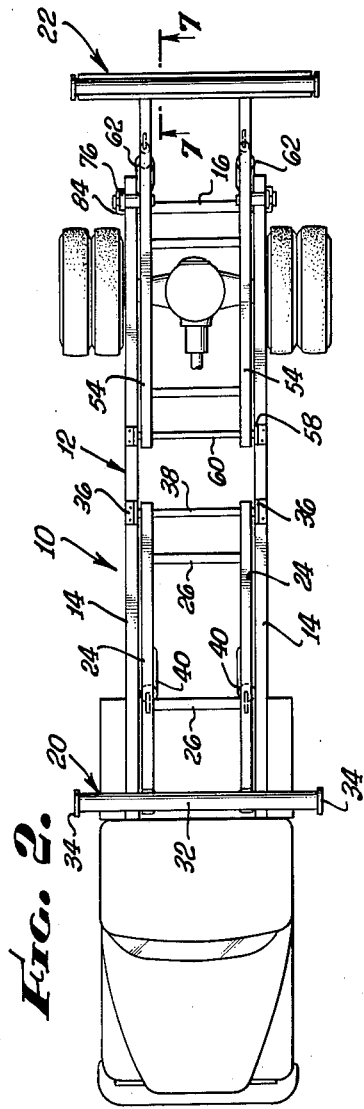
INVENTOR.
FRANK MALCOM
BY John Joseph Hall
ATTORNEY.

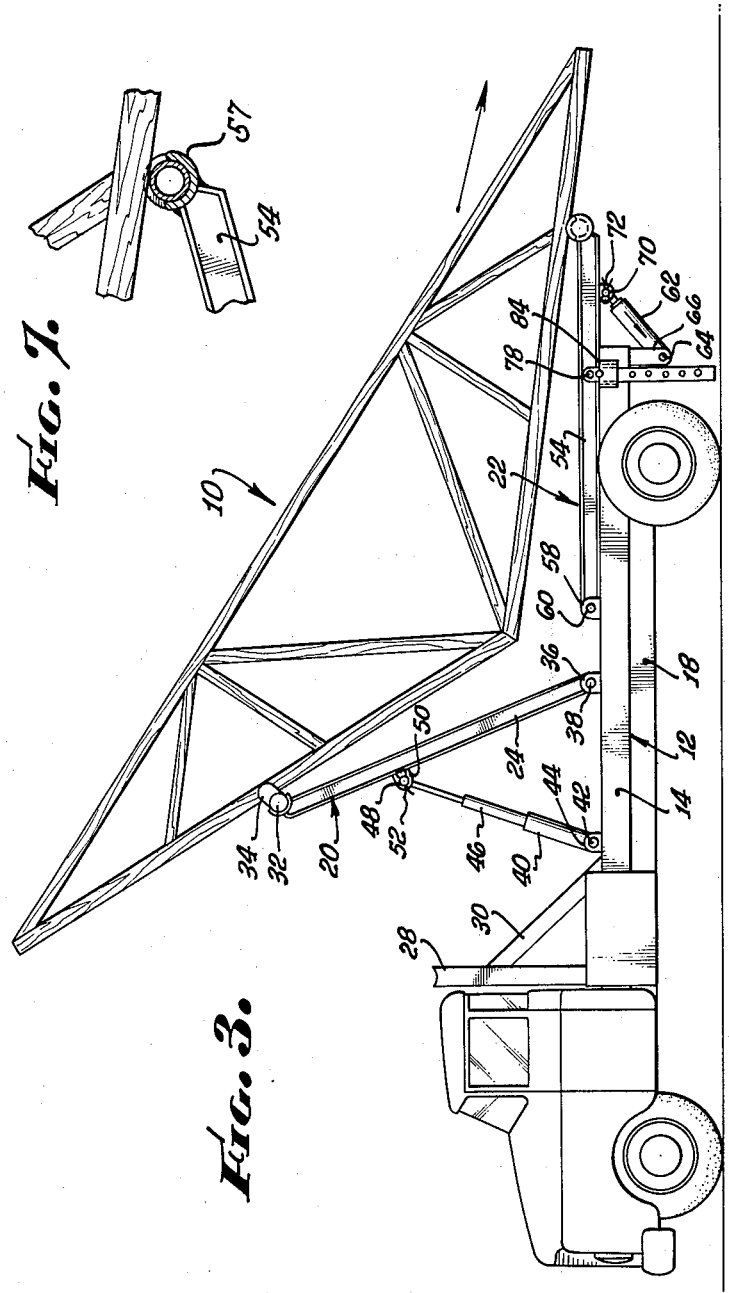

Nov. 23, 1965  F. MALCOM  3,219,211
ADJUSTABLE HYDRAULIC CRADLE HOIST FOR ROOF TRUSSES
Filed Aug. 19, 1963  3 Sheets-Sheet 3
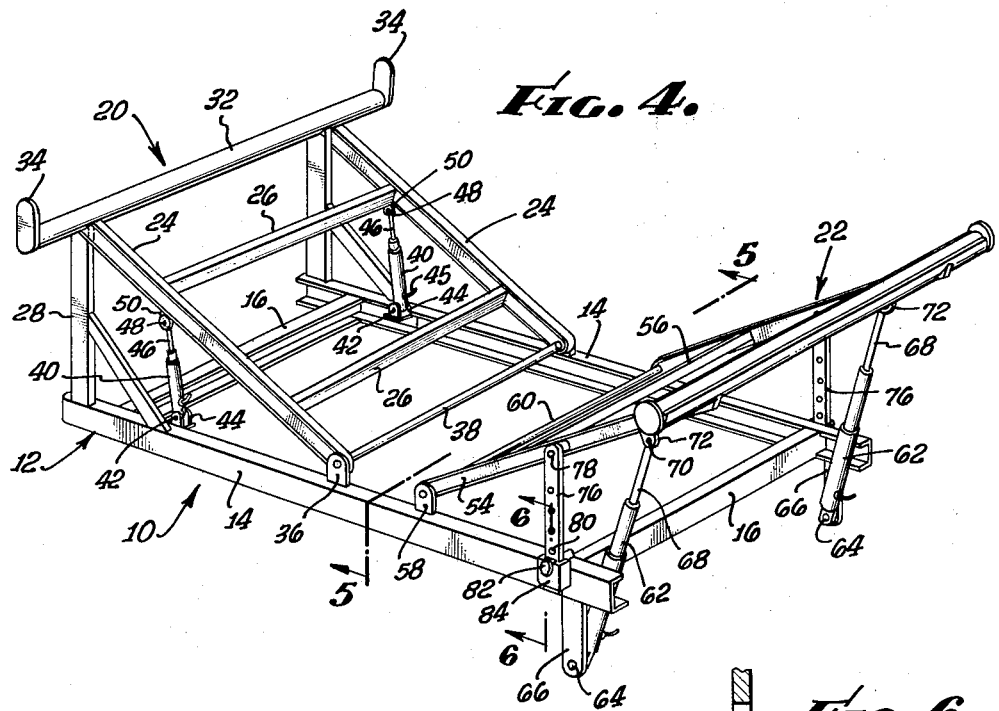
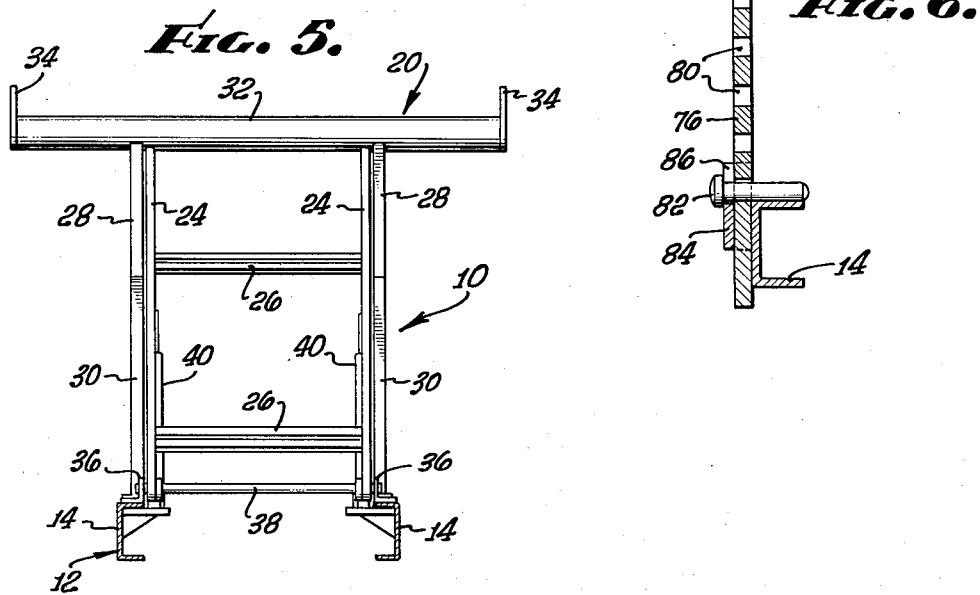
INVENTOR.
FRANK MALCOM
BY John Joseph Hall
ATTORNEY.

United States Patent Office 3,219,211
Patented Nov. 23, 1965

3,219,211
ADJUSTABLE HYDRAULIC CRADLE HOIST
FOR ROOF TRUSSES
Frank Malcom, 5030 Woodman St., Riverside, Calif.
Filed Aug. 19, 1963, Ser. No. 302,806
4 Claims. (Cl. 214—83.26)

This invention relates to hoisting devices, particularly with reference to an adjustable hydraulic cradle for loading, transporting, and unloading prefabricated roof trusses and other long units such as pipe, poles, or beams.

A great need exists for quick and simple means for transporting roof trusses from the place of manufacture to the building site. Hitherto, no single device was available to provide by itself means for loading, transporting, and unloading prefabricated roof trusses and other similar long units.

It is, therefore, an object of this invention to provide a single device with a capability of loading, transporting, and unloading prefabricated roof trusses and the like.

Another object of this invention is to provide such a device which is easy to assemble and is constructed of relatively few parts.

A further object of this invention is to provide a device which is capable of relatively rapid movement in loading, transporting, or unloading prefabricated roof trusses and similar long units.

These and other objects will be more readily understood by reference to the following description, taken in conjunction with the accompanying drawings and claims, in which:

FIGURE 1 is a side elevational view of the adjustable hydraulic cradle supporting a prefabricated roof truss and in place on a truck body.

FIGURE 2 is a top plan view of the adjustable hydraulic cradle.

FIGURE 3 is a side elevational view showing the unloading of a prefabricated roof truss by the adjustable hydraulic cradle.

FIGURE 4 is a perspective view of an embodiment of the invention showing its construction.

FIGURE 5 is a view taken on line 5—5 of FIGURE 4.

FIGURE 6 is a view taken on line 6—6 of FIGURE 4.

FIGURE 7 is a view taken on line 7—7 of FIGURE 2.

The adjustable hydraulic cradle 10 has a frame 12 consisting of two parallel, longitudinal, U-shaped channel bed members 14 and two transverse members 16. The cradle 10 rests on the truck body 18.

The frame 12 supports a front support assembly 20 and a rear support assembly 22. The front support assembly 20 is made up of two parallel longitudinal support members 24 rigidly joined by two parallel transverse support members 26 by welding or other suitable means. While the hydraulic cradle is in a resting position, the front support assembly 20 is supported at its outer end by support posts 28 which are welded or otherwise rigidly mounted to the outer end of channel bed members 14 in a position perpendicular to the plane of channel bed members 14.

Angularly disposed brace members 30 are welded or otherwise suitably fixed to the support posts 28 and to the longitudinal support members 14. A front bunk member 32 with load stops 34 at each end is rigidly mounted by welding or other suitable means to the outer ends of the longitudinal support members 24. The inner ends of the longitudinal support members 24 are pivotally welded to the frame 12 at bearing support blocks 36 by a transverse shaft 38 inserted through holes at the inner ends of the longitudinal support members 24. Bearing support blocks 36 are welded or otherwise suitably mounted on frame 12.

Two hydraulic jacks 40 are pivotally mounted by pins 42 journaled in bearing blocks 44 which are welded or otherwise secured to channel bed members 14, one jack to each channel bed member. The hydraulic jacks 40 have openings 45 to receive hydraulic fluid under high pressure. The plungers 46 of the hydraulic jack 40 each have a hole at their outer end through which a pin 48 is inserted. Each of the pins 48 is journaled in a lug 50 welded or otherwise rigidly secured to each longitudinal support member 24. The pins 48 are maintained in position by cotter pins 52 inserted through holes in the pins 48 on each side of the lugs 50.

The rear support assembly 22 is made up of two parallel longitudinal support members 54 rigidly secured in position by two parallel transverse support members 56 by welding or other suitable means, and is equipped with a transverse roller 57 at the outer ends of support members 54.

The inner ends of the longitudinal support members 24 are pivotally connected to the frame 12 at bearing support blocks 58 by a transverse shaft 60 inserted through holes at the inner ends of the longitudinal support members 54. Bearing support blocks 58 are welded or otherwise suitably secured on the frame 12.

Two hydraulic jacks 62 are pivotally mounted by pins 64 which are journaled in holes at the inside of guide members 66. The guide members are welded or otherwise secured to the under side of parallel U-shaped channel bed members 14.

The plungers 68 of the hydraulic jack 62 each have a hole at their outer end through which a pin 70 is inserted. Each of the pins 70 is journaled in a lug 72 welded or otherwise rigidly secured to the longitudinal support member 54. The pins 70 are maintained in position by cotter pins 74 inserted through holes in the pins 70 on each side of lugs 72.

Safety bars 76 are pivotally mounted approximately in the middle of each of the two parallel longitudinal support members 54 by a pin 78 connecting the upper end of the safety bar to the support members 54. The safety bars 76 have a plurality of openings 80 to receive a safety pin 82 for setting various fixed positions of the rear support assembly 22.

Each safety bar is secured and guided through its lower end by guide members 84 welded to the outer side of the channel bed members 14. The guide members 84 each have a hole 86 through which the safety pins 82 may be inserted when it is desired to set a fixed position of the rear support assembly 22.

When my device is used to load a roof truss, the rear support assembly 22 is raised to a position forming an angle approximately 13° to the vertical. The safety pin 82 is inserted in the safety bar 76 for additional security. The roof truss is then lifted into position on the hydraulic cradle 10 by means of crane (not shown).

When it is desired to unload the roof truss, the truck bearing the hydraulic cradle 10 with the roof truss is stopped at a suitable position, and the brakes of the truck are set. Next, the pair of hydraulic jacks 40 for the front support assembly 20 are raised, while the hydraulic jacks 62 for the rear support assembly 22 are being lowered. The effect of this combined movement will cause the roof truss to roll over on the rear support assembly 22. As the rear support assembly 22 approaches a horizontal position, the roof truss will slide off the hydraulic cradle 10 to the ground, ready for installation as desired.

The rear support assembly 22 may be raised or lowered by means of the hydraulic jacks 62 to adjust the hydraulic cradle 10 for trusses of various pitches. Also, the hydraulic cradle 10 may be adjusted in this fashion to provide for a lower gravity center of the load, thereby increasing the speed and safety of transport of the roof truss.

While the roof truss is being transported in the hydraulic cradle 10, the safety pin 82 in the safety bar 76 insures rigid support of the roof truss in the absence of any hydraulic pressure from the hydraulic jack 62. The support posts 28 are rigid and therefore, in conjunction with the safety bar 76, a rigid hydraulic cradle 10 is provided.

The channel bed members 14 may be attached directly to the frame of a truck as shown in FIG. 1. Further, the truck itself may contain a reservoir of hydraulic fluid for use in raising or lowering the hydraulic jacks 40 and 62.

Although I have described my invention with reference to the accompanying drawings illustrating preferred embodiments of my invention, it is understood that numerous changes in the details of construction and arrangement of parts may be made without departing from the spirit and scope of the invention as hereinafter claimed.

I claim:

1. An adjustable cradle hoist for transporting and unloading prefabricated roof trusses comprising,
   a vehicle;
   a frame mounted on said vehicle and having two longitudinal channel bed members rigidly spaced by a transverse member;
   a front support assembly having two parallel longitudinal support members rigidly spaced by a transverse support member;
   a pair of front bearing support members rigidly mounted on the frame and rotatably receiving a pivotable shaft member connecting the inner ends of said longitudinal support members;
   an upright support post member mounted at the front end of the frame to bear the front support assembly;
   a rear support assembly having two parallel longitudinal support members rigidly spaced by a transverse support member;
   a pair of rear bearing support members rigidly mounted on the frame and rotatably receiving a pivotable shaft member connecting the inner ends of said longitudinal support members;
   an adjustable upright support member mounted at the rear end of the frame to bear the rear support assembly;
   means for raising the front support assembly while simultaneously lowering the rear support assembly and for maintaining the orientation of the free ends of the front and rear longitudinal support members constant relative to each other at all times;
   and roller means pivotally mounted on the outer portion of the rear support assembly to enable the roof truss to roll off the cradle hoist.

2. An adjustable cradle hoist for transporting and unloading prefabricated roof trusses comprising,
   a vehicle;
   a frame mounted on said vehicle and having two parallel longitudinal channel bed members rigidly spaced by two transverse members;
   a front support assembly having two parallel longitudinal support members rigidly spaced by two transverse members and having a front bunk member transversely mounted on the outer ends of the support members to receive one side of a prefabricated roof truss;
   a pair of front bearing support members rigidly mounted on the frame and rotatably receiving a pivotable shaft member connecting the inner ends of said longitudinal support members;
   two upright support members rigidly mounted at the front end of the frame to bear the front support assembly;
   a rear support assembly having two parallel longitudinal support members rigidly spaced by two transverse support members;
   a pair of rear bearing support members rigidly mounted on the frame and rotatably receiving a pivotable shaft member connecting the inner ends of said longitudinal support members;
   two upright support members adjustably mounted at the rear end of the frame to bear the rear support assembly and capable of up and down movement to be set at a fixed position;
   hydraulic means for raising the front support assembly while simultaneously lowering the rear support assembly and for maintaining the orientation of the free ends of the front and rear longitudinal support members constant relative to each other at all times;
   and roller means pivotally mounted on the outer portion of the rear support assembly to enable the roof truss to roll off the cradle hoist.

3. An adjustable cradle hoist for transporting and unloading prefabricated roof trusses comprising,
   a vehicle;
   a frame mounted on said vehicle and having two parallel longitudinal channel bed members rigidly spaced by two transverse members;
   a front support assembly having two parallel longitudinal support members rigidly spaced by two transverse members and having a front bunk member transversely mounted on the outer ends of the support members to receive one side of a prefabricated roof truss;
   a front pivotable shaft member connecting the inner ends of said longitudinal support members and rotatably mounted on the frame;
   two upright support members rigidly mounted at the front end of the frame to bear the front support assembly;
   a rear support assembly having two parallel longitudinal support members rigidly spaced by two transverse support members;
   a rear pivotable shaft member connecting the inner ends of said longitudinal support members and rotatably mounted to the frame;
   two upright support members adjustably mounted at the rear end of the frame to bear the rear support assembly and capable of up and down movement to be set at a fixed position;
   means for raising the front support assembly while simultaneously lowering the rear support assembly and for maintaining the orientation of the free ends of the front and rear longitudinal support members constant relative to each other at all times;
   and roller means pivotally mounted on the outer portion of the rear support assembly to enable the roof truss to roll off the cradle hoist.

4. An adjustable cradle hoist according to claim 3 in which the means for lowering the rear support assembly to a horizontal position comprises a pair of hydraulic jacks pivotally mounted on each side of the rear end of the frame, each jack having a plunger pivotally connected at its end to a longitudinal support member of the rear support assembly, and the means for raising the front support assembly comprises a pair of hydraulic jacks pivotally mounted on each side of the front end of the frame, each jack having a plunger pivotally connected at its end to a longitudinal support member of the front support assembly.

References Cited by the Examiner

UNITED STATES PATENTS

| | | | |
|---|---|---|---|
| 2,271,213 | 1/1942 | Weidner et al. | |
| 2,536,561 | 1/1951 | Mickam | 214—84 |
| 2,712,874 | 7/1955 | Murray. | |
| 2,739,836 | 3/1956 | Kilpatrick | 214—77 X |
| 3,091,498 | 5/1963 | Goodwin. | |
| 3,154,207 | 10/1964 | Long | 214—501 |

GERALD M. FORLENZA, *Primary Examiner.*

HUGO O. SCHULZ, *Examiner.*